(12) United States Patent
Kim et al.

(10) Patent No.: US 8,264,454 B2
(45) Date of Patent: Sep. 11, 2012

(54) ELECTROPHORETIC DISPLAY AND DRIVING METHOD THEREOF

(75) Inventors: Young Sik Kim, Gyeongsangbuk-do (KR); Sung Woo Shin, Chungcheongbuk-do (KR)

(73) Assignee: LG Display Co., Ltd., Seoul (KR)

( * ) Notice: Subject to any disclaimer, the term of this patent is extended or adjusted under 35 U.S.C. 154(b) by 992 days.

(21) Appl. No.: 11/819,137

(22) Filed: Jun. 25, 2007

(65) Prior Publication Data

US 2008/0150887 A1 Jun. 26, 2008

(30) Foreign Application Priority Data

Dec. 23, 2006 (KR) ........................ 10-2006-0133223

(51) Int. Cl.
*G09G 3/34* (2006.01)
(52) U.S. Cl. ...................... 345/107; 345/209; 359/296
(58) Field of Classification Search .................. 345/107, 345/204, 211, 208–210, 690; 359/296
See application file for complete search history.

(56) References Cited

U.S. PATENT DOCUMENTS

| | | | |
|---|---|---|---|
| 5,606,343 A * | 2/1997 | Tsuboyama et al. ............ | 345/97 |
| 7,012,600 B2 | 3/2006 | Zehner et al. | |
| 7,119,772 B2 | 10/2006 | Amundson et al. | |
| 7,532,174 B2 * | 5/2009 | Luk ................................ | 345/3.1 |
| 2002/0005832 A1 * | 1/2002 | Katase .......................... | 345/107 |
| 2004/0222984 A1 * | 11/2004 | Hamaguchi .................... | 345/211 |
| 2005/0146775 A1 * | 7/2005 | Chung et al. .................. | 359/296 |
| 2006/0139305 A1 * | 6/2006 | Zhou et al. .................... | 345/107 |
| 2006/0192751 A1 * | 8/2006 | Miyasaka et al. ............. | 345/107 |
| 2006/0221050 A1 * | 10/2006 | Sakamoto et al. ............ | 345/107 |
| 2007/0085819 A1 * | 4/2007 | Zhou et al. .................... | 345/107 |
| 2007/0176889 A1 * | 8/2007 | Zhou et al. .................... | 345/107 |

FOREIGN PATENT DOCUMENTS

| WO | WO 2004/086348 | * | 10/2004 |
|---|---|---|---|
| WO | WO 2005/101362 | * | 10/2005 |

* cited by examiner

*Primary Examiner* — Lun-Yi Lao
*Assistant Examiner* — Jarurat Suteerawongsa
(74) *Attorney, Agent, or Firm* — Morgan, Lewis & Bockius LLP

(57) ABSTRACT

An electrophoretic display device sequentially driven during a data updating period when a data is updated and a sleep-mode period when a data is maintained includes an electrophoretic display panel including a plurality of data lines crossing a plurality of gate lines to form a plurality of cells, a plurality of pixel electrodes, a common electrode for driving each of the plurality of cells, and a TFT at a crossing of one of the data lines and one of the gate lines to supply a data voltage from the one of the data lines to a corresponding one of the pixel electrodes; a data driving circuit supplying the data voltage to the data lines during the data updating period; a gate driving circuit supplying a scanning pulse to the gate lines during the data updating period; and a controller sequentially raising an impedance of each of the data lines, the common electrode, and the gate lines during the sleep-mode period.

22 Claims, 13 Drawing Sheets

ELECTROPHORETIC DISPLAY AND DRIVING METHOD THEREOF

This application claims the benefit of Korean Patent Application No. 10-2006-133223 filed in Korea on Dec. 23, 2006, which is hereby incorporated by reference in its entirety.

BACKGROUND OF THE INVENTION

1. Field of the Invention

Embodiments of the present invention relate to a display device, and more particularly, to an electrophoretic display device. Embodiments of the present invention are suitable for a wide range of applications. In particular, embodiments of the present invention are suitable for preventing a characteristic degradation of a semiconductor switching device.

2. Description of the Related Art

If a material having electric charge is placed in DC electric field, the material peculiarly moves in accordance with electric charges, the size and shape of molecules and the like. Such a movement, i.e., a phenomenon in which materials are separated by the difference of movement, is named 'Electrophoresis'. Recently, a display device using electrophoresis has been developed and attention has been paid thereto as a medium with which a conventional paper medium could be replaced.

The display using electrophoresis has been disclosed in U.S. Pat. No. 7,012,600 and U.S. Pat. No. 7,119,772. The electrophoretic display device of the related art updates a data through a reset period, a stabilization period, and a data writing period. In this case, micro capsules which are mixed with particles non-uniformly charged in accordance with an initial state, are initialized for the reset period. A black particle and a white particle within the micro capsules are entirely separated from each other to be stabilized the micro capsules at a bistable state for the stabilization period. A next data voltage to be updated is supplied for the data writing period. Approximately, 128 number of frame periods are comprised of the reset period, the stabilization period, and the data writing period. Such an electrophoretic display updates an image by the micro capsules through the 128 frame periods. After completing an update of the image, an image of the electrophoretic display is not changed until about 6 months after turning-off the power of the electrophoretic display.

On the other hand, after completing the update of the image, the electrophoretic display can be driven in a sleep-mode of low power consumption. The power of the electrophoretic display is not turned-off in the sleep-mode. A gate low voltage is applied to gate lines in the sleep-mode for a long time. A thin film transistor (hereinafter, referred to as "TFT") having a gate electrode which is connected to a gate line, has a gate bias stress by a gate low voltage. Herein, the gate low voltage is supplied in the sleep-mode for a long time. Accordingly, the related art electrophoretic display has a problem in that a characteristics of the TFT is degraded in the sleep-mode to change a threshold voltage of the TFT or increase an off current.

SUMMARY OF THE INVENTION

Accordingly, embodiments of the present invention are directed to a reference voltage generating circuit and a driving method thereof that substantially obviates one or more of the problems due to limitations and disadvantages of the related art.

An object of an embodiment of the present invention to prevent a characteristics degradation of a semiconductor switching device in an electrophoretic display device.

Another object of an embodiment of the present invention is to reduce a stress on a semiconductor switching device in an electrophoretic display device.

Another object of an embodiment of the present invention is to reduce a power consumption in an electrophoretic display device.

Another object of an embodiment of the present invention is to protect an electrophoretic display device from static electricity.

In order to achieve these and other objects of the invention, an electrophoretic display device sequentially driven during a data updating period when a data is updated and a sleep-mode period when a data is maintained includes an electrophoretic display panel including a plurality of data lines crossing a plurality of gate lines to form a plurality of cells, a plurality of pixel electrodes, a common electrode for driving each of the plurality of cells, and a TFT at a crossing of one of the data lines and one of the gate lines to supply a data voltage from the one of the data lines to a corresponding one of the pixel electrodes; a data driving circuit supplying the data voltage to the data lines during the data updating period; a gate driving circuit supplying a scanning pulse to the gate lines during the data updating period; and a controller sequentially raising an impedance of each of the data lines, the common electrode, and the gate lines during the sleep-mode period.

In another aspect, an electrophoretic display device sequentially driven during a data updating period when a data is updated and a sleeping period when a data is maintained includes an electrophoretic display panel including a plurality of data lines crossing a plurality of gate lines to form a plurality of cells, a plurality of pixel electrodes, a common electrode for driving each of the plurality of cells, and a TFT at a crossing of one of the data lines and one of the gate lines to supply a data voltage from the one of the data lines to a corresponding one of the pixel electrodes; a data driving circuit supplying a data voltage to the data lines during the data updating period; a gate driving circuit supplying a scanning pulse swung between a gate high voltage and a gate low voltage to the gate lines during the data updating period; and a controller sequentially converging voltages of the data lines and of the common electrode to a ground voltage during the sleeping period.

In another aspect, a method of driving an electrophoretic display device including an electrophoretic display panel including a plurality of data lines crossing a plurality of gate lines to form a plurality of cells, a plurality of pixel electrodes, a common electrode for driving each of the plurality of cells, and a TFT at a crossing of one of the data lines and one of the gate lines to supply a data voltage from the one of the data lines to a corresponding one of the pixel electrodes includes supplying a data voltage to the one of data lines during a data updating period; supplying a scanning pulse to the one of the gate lines during the data updating period and sequentially raising the plurality of the data lines, the common electrode, and the plurality of the gate lines into a high impedance state in a sleeping period following the data updating period.

In another aspect, a method of driving an electrophoretic display device including an electrophoretic display panel including a plurality of data lines crossing a plurality of gate lines to form a plurality of cells, a plurality of pixel electrodes, a common electrode for driving each of the plurality of cells, and a TFT at a crossing of one of the data lines and one of the gate lines to supply a data voltage from the one of the data lines to a corresponding one of the pixel electrodes includes supplying a data voltage to one of the data lines during a data updating period; supplying a scanning pulse swung between a gate high voltage and a gate low voltage to one of the gate lines during the data updating period; and sequentially converging voltages of the gate lines and of the common electrode into a ground voltage in a sleeping period following the data updating period.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this application, illustrate embodiments of the present invention and together with the description serve to explain the principle of embodiments of the present invention. In the drawings.

DETAILED DESCRIPTION OF EXEMPLARY EMBODIMENTS

Reference will now be made in detail to exemplary embodiments of the present invention, which are illustrated in the accompanying drawings. Wherever possible, the same reference numbers will be used throughout the drawings to refer to the same or like parts.

Figure 1:
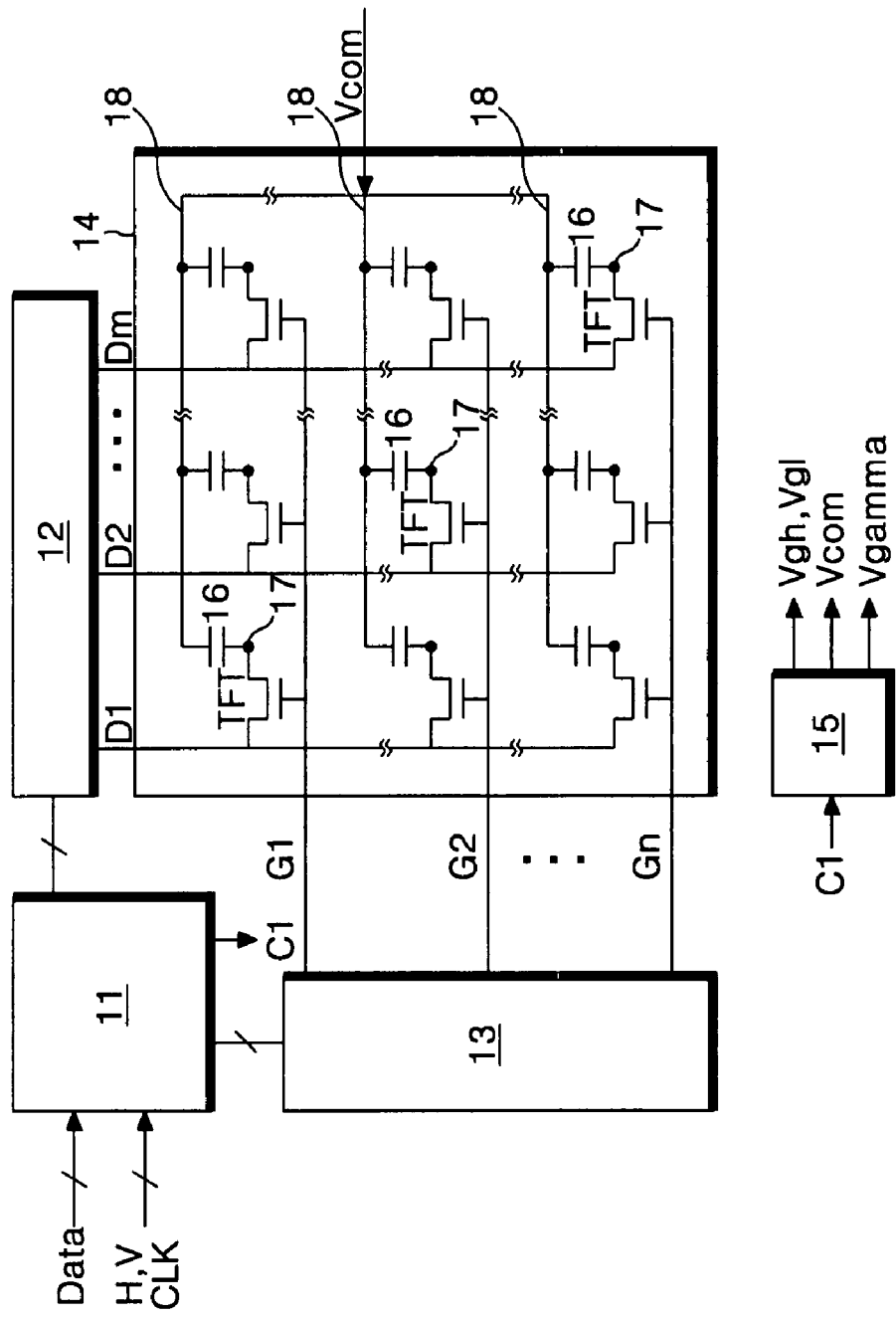
FIG. 1 shows a block diagram of an electrophoretic display device according to an embodiment of the present invention.

FIG. 1 shows a block diagram of an electrophoretic display device according to an embodiment of the present invention.

Figure 2:
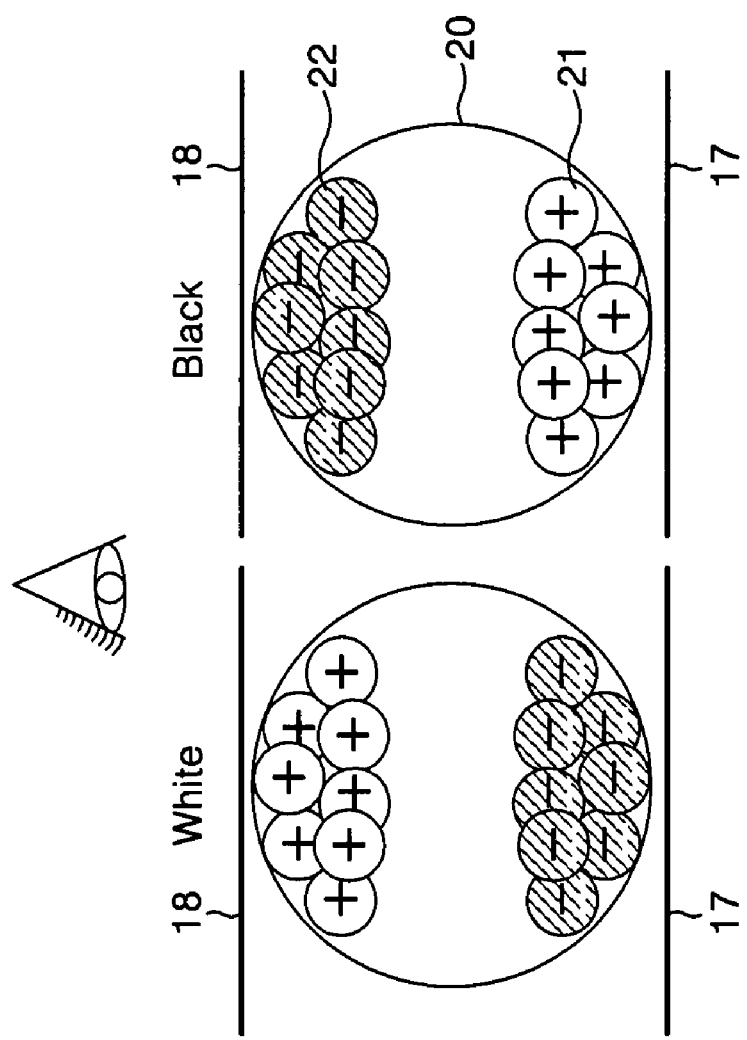
FIG. 2 shows a diagram of a micro capsule structure of a cell in the electrophoretic display device of FIG. 1.

FIG. 2 shows a diagram of a micro capsule structure of a cell in the electrophoretic display device of FIG. 1. Referring to FIG. 1 and FIG. 2, the electrophoretic display according to an embodiment of the present invention includes a display panel 14 where m×n number of cells 16 are arranged, a data driving circuit 12 for supplying data voltages to data lines D1 to Dm of the display panel 14, a gate driving circuit 13 for supplying scan pulses to gate lines G1 to Gn of the display panel 14, a DC to DC converter 15 generating driving voltages to be supplied to the display panel 14, and a timing controller 11 controlling the data and gate driving circuits 12 and 13 and the DC to DC converter 15.

The display panel 14 has a plurality of micro capsules 20 formed between two substrates, as in FIG. 2. Each of the micro capsules 20 includes white particles 21 which are electrically charged to be positive and black particles 22 which are electrically charged to be negative. The m number of data lines D1 to Dm and the n number of gate lines G0 to Gn which are formed on a lower substrate of the display panel 14 are made to cross each other. Thin film transistors are connected in crossings of the data lines D1 to Dm and the gate lines G1 to Gn. A source electrode of the TFT is connected to the data line D1 to Dm and a drain electrode thereof is connected to a pixel electrode 17. And, a gate electrode of the TFT is connected to the gate line G1 to Gn. The TFT is turned on in response to a scan pulse from the gate line G1 to Gn, thereby selecting cells 16 of one line which are intended to be displayed. A common electrode 18 is formed on an upper transparent substrate of the display panel 14 for simultaneously supplying a common voltage Vcom to all the cells.

On the other hand, the micro capsules 20 might include the negatively charged white particles and the positively charged black particles. In this case, the phase and voltage of the later-described drive waveform might be changed.

The data driving circuit 12 has a plurality of data drive integrated circuits of which each includes a shift register, a latch, a digital to analog converter, an output buffer and etc. The data driving circuit 12 latches the digital data under control of the timing controller 11, converts the digital data into a gamma compensation voltage Vgamma to generate the data voltage, and then supplies the data voltage to the data lines D1 to Dm.

The gate driving circuit 13 has a plurality of gate drive integrated circuits of which each includes a shift register, a level shifter for converting a swing width of an output signal of the shift register into a swing width which is suitable for driving the TFT, and an output buffer being connected between the level shifter and the gate line G1 to Gn. The gate driving circuit 13 sequentially outputs the scan pulses synchronized with the data voltages supplied to the data lines D1 to Dm. The scanning pulses are swung between a gate low voltage Vgl and a gate high voltage Vgh. Herein, the scanning pulses are supplied to the gate lines G1 to Gn, and the gate high voltage Vgh is higher than the threshold voltage of the TFT.

The DC to DC converter 15 generates a common voltage Vcom, the gate high voltage Vgh, the gate low voltage Vgl, and the gamma compensation voltage Vgamma using a DC power from a system power. A range of the common voltage Vcom is about −1V to −2V, and the gate low voltage Vgl is about −20V.

The timing controller 11 receives vertical/horizontal synchronization signals V, H and a clock signal CLK, and generates control signals controlling operation timings of the data and gate driving circuits 12, 13 and a control signal C1 controlling the DC to DC converter 15. Further, the timing controller 11 compares a present image with a next image to generate a digital data of 2 bits corresponding to a driving waveform of a data voltage, and supplies the digital data to the data driving circuit 12. Herein, the data voltage is supplied to the data lines D1 to Dm. In the sleep-mode after updating a data, the timing controller 11 sequentially controls the data driving circuit 12, the DC to DC converter 15, and the gate driving circuit 13 similar to the later-described first to fourth embodiments.

Figure 3:
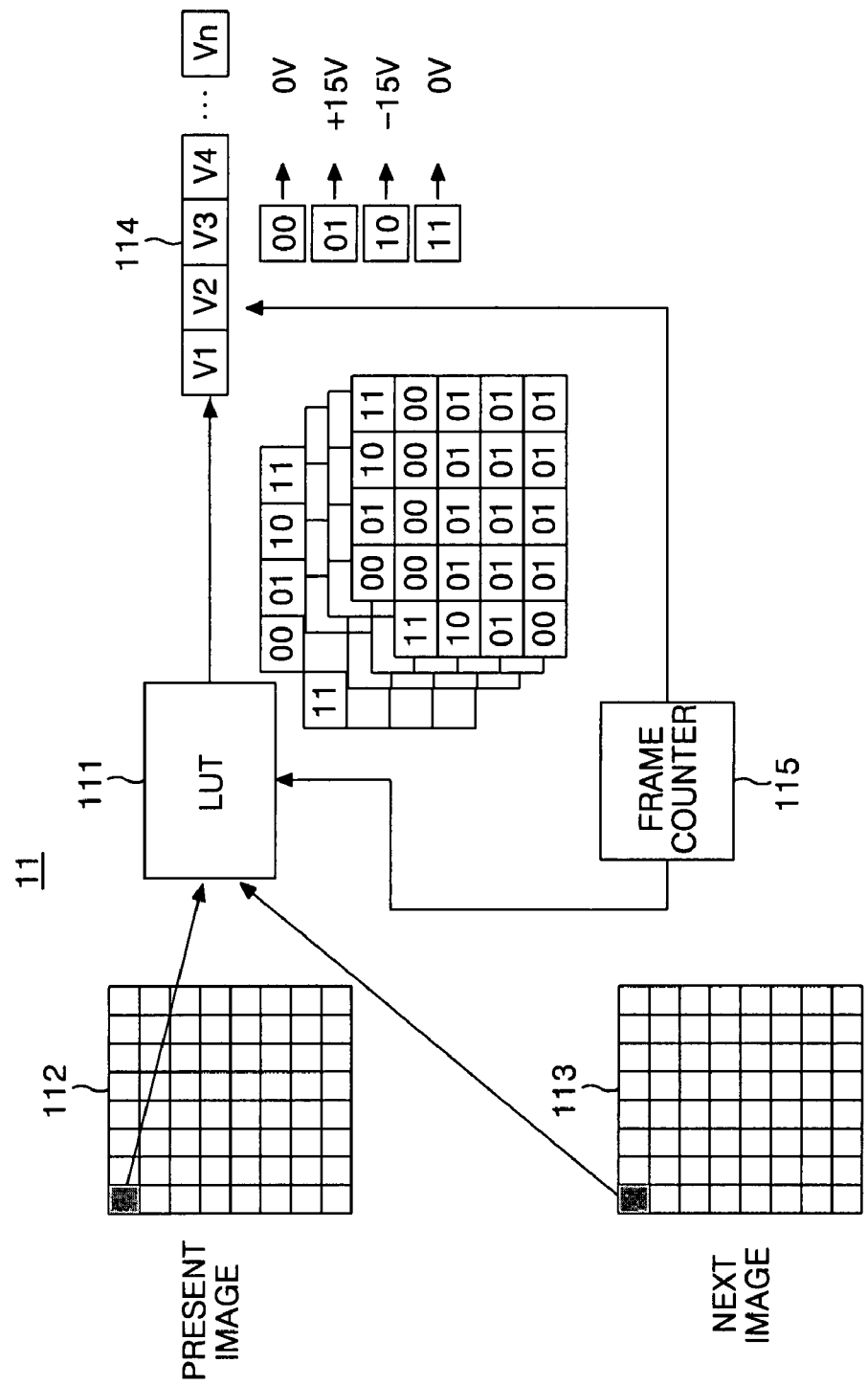
FIG. 3 shows a schematic diagram of a circuit for generating a data voltage waveform in the electrophoretic display device of FIG. 1.

FIG. 3 shows a schematic diagram of a circuit for generating a data voltage waveform in the electrophoretic display device of FIG. 1. Referring to FIG. 3, the timing controller compares the present image with the next image for each cells using a look-up table LUT 111, a plurality of memories 112, 113, and 114, and a frame counter 115 to determine digital data V1 to Vn. Herein, the digital data V1 to Vn determine a driving waveform of the data voltage with which the data lines D1 to Dm are supplied for a plurality of frame periods. The first and second frame memories 112 and 113 separate and store the present image and the next image.

The look-up table 111 compares the present image with the next image to output digital data in accordance with the comparison result. Herein, the digital data determines a driving waveform of the data voltage with which the data lines D1 to Dm are supplied for a plurality of frame periods which are required at a date update in the look-up table similar to FIG. 4, for example, the 128 number of frame periods. The digital data V1 to Vn outputted from the look-up table 111 determine voltages of three states which are supplied to the pixel electrode 17 of each cell such as '00', '01', '10', and '11', etc., that is, Ve+, Ve−, and Ve0. Herein, '00' and '11' are converted into 0V, '01' is converted into Ve+(+15V), and '10' is converted into Ve−(−15V). The memory 114 can be provided within the data driving circuit 12.

Figure 4:
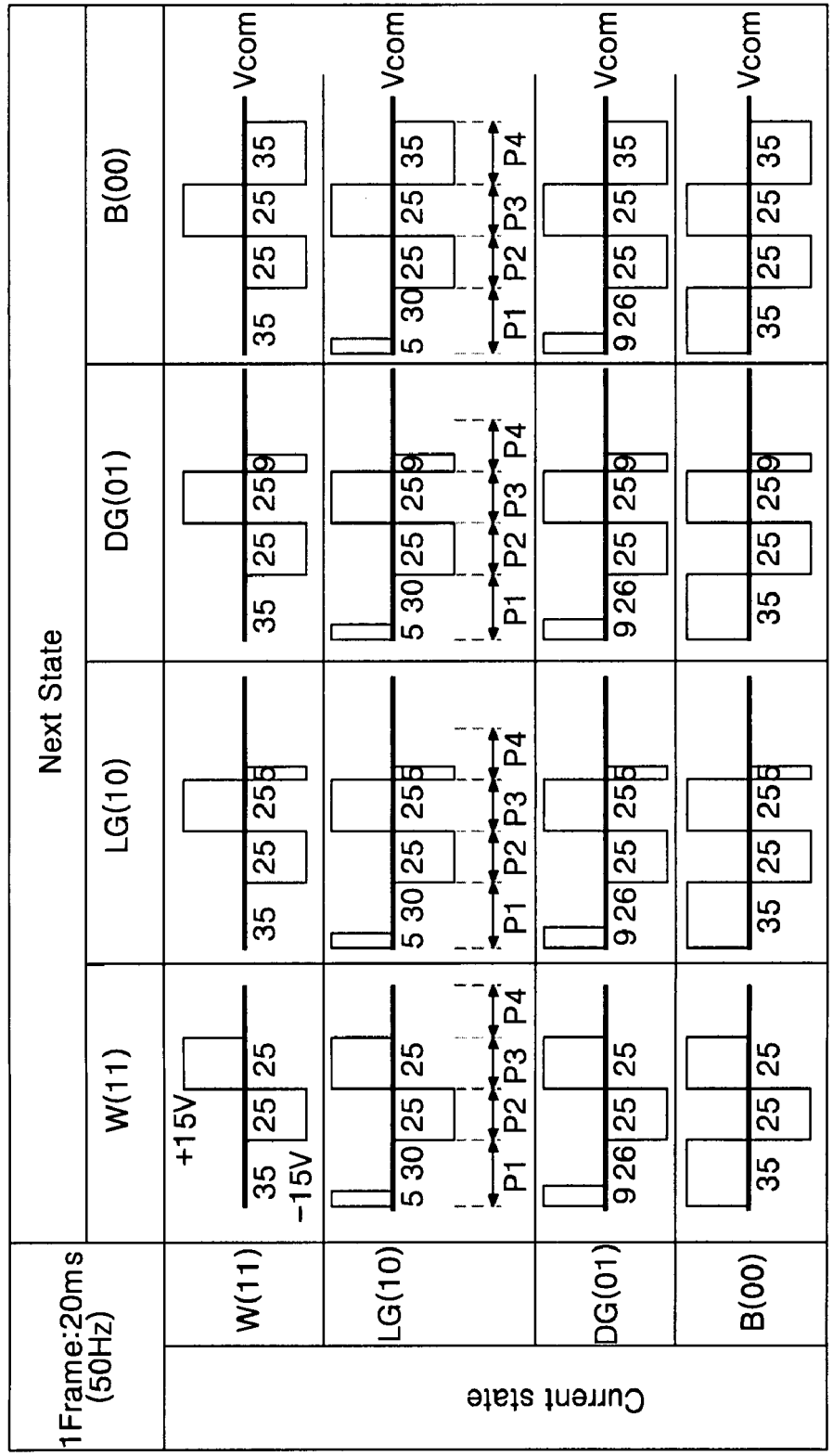
FIG. 4 shows data voltage waveforms in the lookup table shown in FIG. 3.

FIG. 4 shows data voltage waveforms in the lookup table shown in FIG. 3. Referring to FIG. 4, 'W(11)' represents a peak white gray level, 'LG(10)' represents a bright intermediate gray level, 'DG(01)' represents a dark intermediate gray level, and 'B(00)' represents a peak black gray level. And, the number written under the drive waveform is the number of frames.

Figure 5:
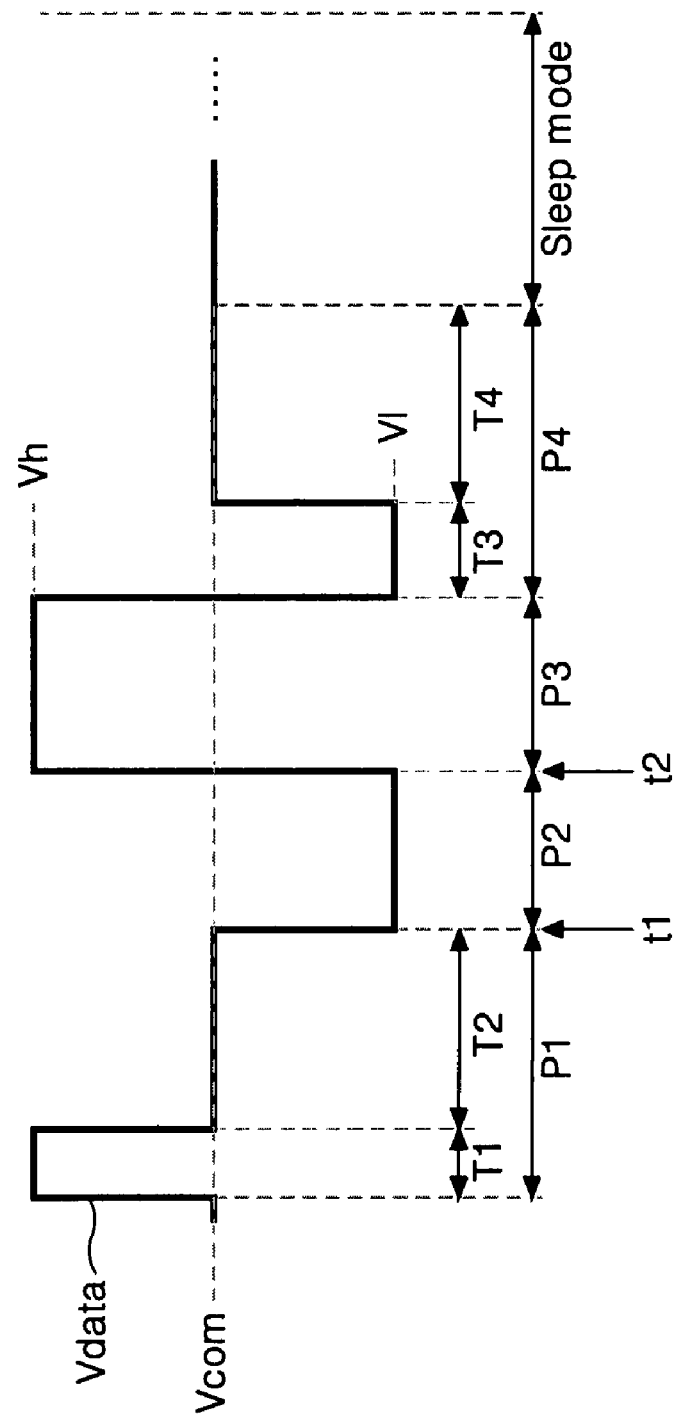
FIG. 5 shows an exemplary data waveform voltage according to an embodiment of the present invention.

FIG. 5 shows an exemplary data waveform voltage according to an embodiment of the present invention. Referring to FIG. 4 and FIG. 5, the electrophoretic display according to an embodiment of the present invention is divided into a reset period P1, a first stabilization period P2, a second stabilization period P2, and a data writing period P4. Furthermore, the electrophoretic display according to an embodiment of the present invention drives the micro capsules 20 using a time-division driving method to update a data of the micro capsules 20.

The reset period P1 includes a first interval T1 and a second interval T2. Herein, a data voltage Vdata of high potential voltage Vh is generated at the first interval T1, and the data voltage Vdata of 0V is generated at the second interval T2. A number of frames of the first interval T1 may be varied in accordance with the present image. For example, when the present data gray scale is W(11), the first interval T1 is '0' and is wider at DG(01) than LG(10), and is wider at B(00) than DG(01) as shown in FIG. 4. If the first interval T1 is widened within the reset period P1, the second interval T2 is relatively narrowed, and if the first interval T1 is narrowed within the reset period P1, the second interval T2 is relatively widened. A white particle 21 and a black particle 22 of the micro capsule 20 are differently distributed for each cell in accordance with the present data. Herein, the micro capsule 20 is driven at the present image. A number of frames which supplies the data voltage Vdata of high potential voltage Vh is increased as the present data gray scale is lower to initialize a particle distribution of the micro capsules 20 in all cells for the first interval T1.

The white particles and the black particles within the micro capsules 20 are separated from each other in all cells, so that the micro capsules are stabilized at the bistable state for the first and second stabilization periods P2 and P3. A data voltage Vdata of low potential voltage V1 is generated for the first stabilization period P2. Positively charged white particles of the micro capsules 20 move toward the pixel electrode 17 in response to the data voltage Vdata in all cells. Negatively charged white particles of the micro capsules 20 move toward the common electrode 18 in response to the data voltage Vdata in all cells. A black particle and a white particle are measurably mixed with each other within the micro capsule 20 immediately after the first stabilization period P2. Herein, the degree of mixing may be non-uniform for each cell.

A data voltage Vdata of high potential voltage Vh is generated for the second stabilization period P3. Positively charged white particles of the micro capsules 20 move toward the common electrode 18 in response to the data voltage Vdata in all cells. Negatively charged white particles of the micro capsules 20 move toward the pixel electrode 17 in response to the data voltage Vdata in all cells. A black particle and a white particle are spatially separated from each other to be stabilized at the bistable state within the micro capsule 20 of all cells immediately after the second stabilization period P3.

The data writing period P4 includes a third interval T3 and a fourth interval T4. Herein, a data voltage Vdata of low potential voltage V1 is generated at the third interval T3, and the data voltage Vdata of 0V is generated at the fourth interval T4. A number of frames of the third interval T3 may be determined in accordance with the next data gray scale. For example, when the next data gray scale is W(11), the third interval T3 is '0' and is wider at DG(01) than LG(10), and is wider at B(00) than DG(01) as shown in FIG. 4. If the third interval T3 is widened within the data writing period P4, the fourth interval T4 is relatively narrowed, and if the third interval T3 is narrowed within the data writing period P4, the fourth interval T4 is relatively widened.

A next image data is written at each cell through a process of updating the data including an initialization, a stabilization, and a process of writing a data for a plurality of frame periods, for example, the 128 number of frame periods. After updating the data, the electrophoretic display according to an embodiment of the present invention operates the data/gate driving circuits 12 and 13 and the common voltage generation circuit in the sleep-mode under the control of the timing controller 11. The cells of the display panel 14 maintain the updated image in the sleep-mode.

Figure 6:
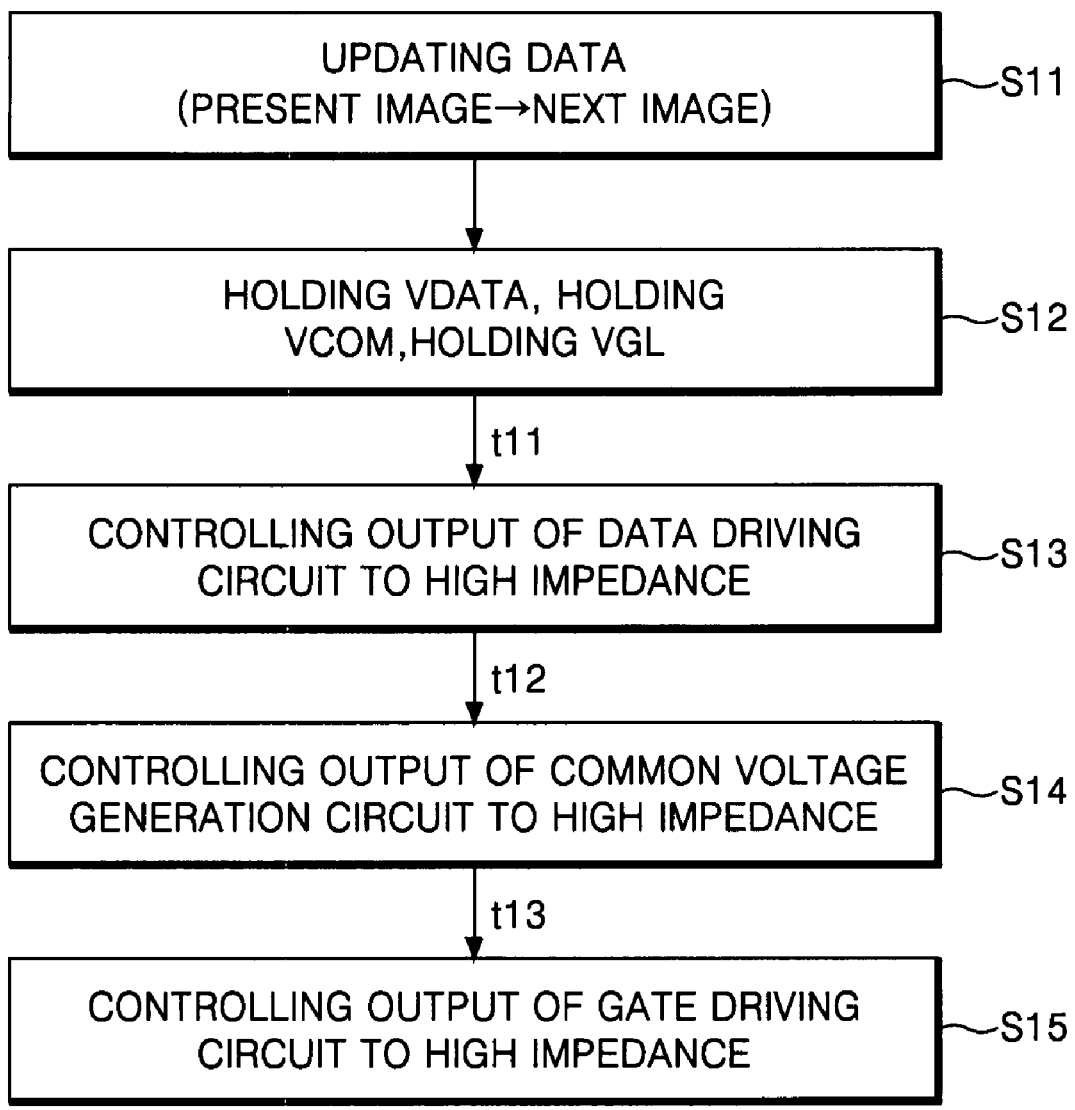
FIG. 6 shows a flow chart of an operation of an electrophoretic display device in a sleep-mode period according to a first embodiment of the present invention.
Figure 7:
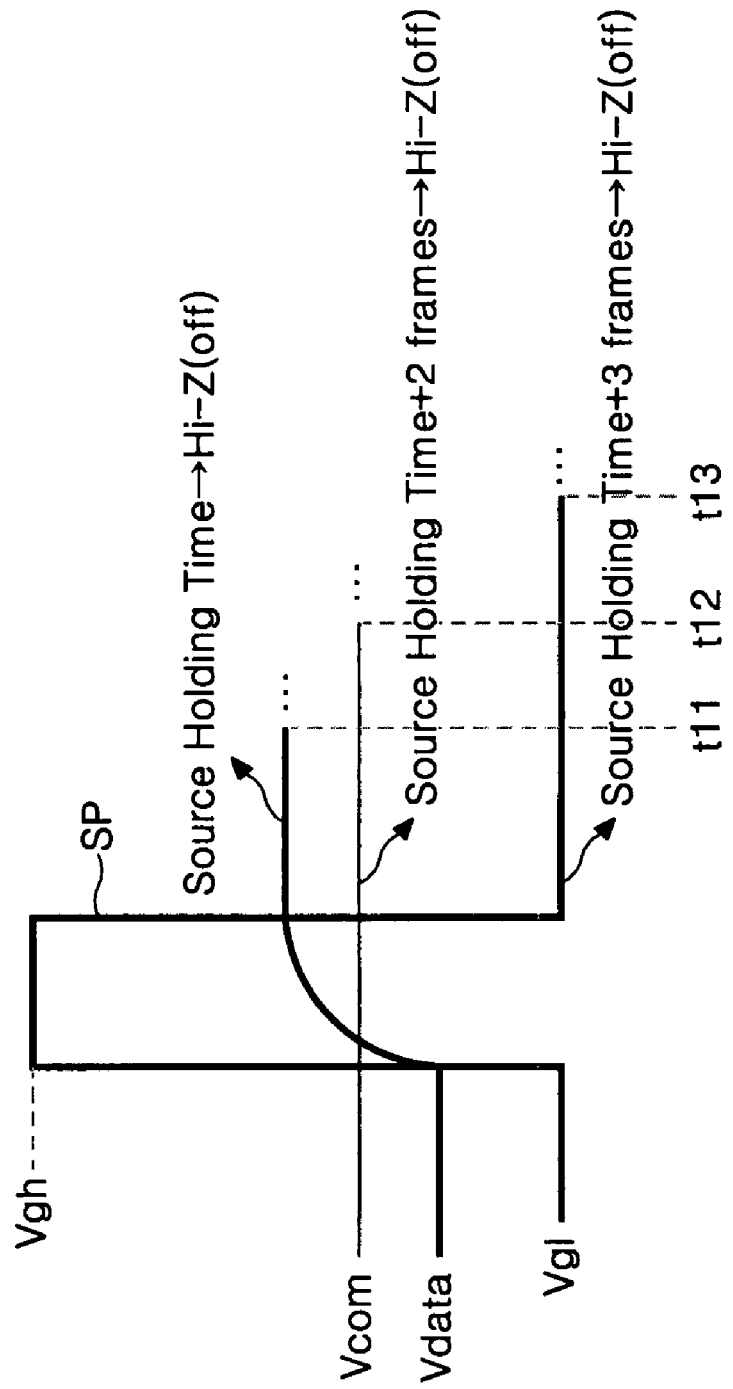
FIG. 7 shows a flow chart of a voltage waveform of an electrophoretic display device according to the first embodiment of the present invention.

FIG. 6 shows a flow chart of an operation of an electrophoretic display device in a sleep-mode period according to a first embodiment of the present invention. FIG. 7 shows a flow chart of a voltage waveform of an electrophoretic display device according to the first embodiment of the present invention. Referring to FIG. 6 and FIG. 7, after updating the data, the data driving circuit 12 maintains the data voltage Vdata substantially unchanged under the control of the timing controller 11 for a source holding time of about 2 μs. The gate driving circuit 13 lowers voltages of the gate lines G1 to Gn to the gate low voltage Vgl under the control of the timing controller 11 after updating the data. The DC to DC converter 15 maintains the common voltage Vcom after updating the data (S11 and S12).

Next, the data driving circuit 12 opens output terminals which are connected to the data lines D1 to Dm under the control of the timing controller 11 at a t11 point past the source holding time to raise the data lines D1 to Dm into a high impedance state (S13) by turning off the corresponding TFT.

The DC to DC converter 15 opens an output terminal under the control of the timing controller 11 at a t12 point about 1 to 2 frame periods past the source holding time to raise the common electrode 18 into the high impedance state (S14). Herein, the output terminal is connected to the common electrode 18.

The gate driving circuit 13 opens output terminals which are connected to the gate lines G1 to Gm under the control of the timing controller 11 at a t 13 point about 1 to 3 frame periods past the source holding time to raise the gate lines G1 to Gm into the high impedance state (S15).

The method of driving the electrophoretic display according to the first embodiment of the present invention controls voltages of the gate lines G1 to Gn to the high impedance state in the sleep-mode to reduce the gate bias stress of the TFTs, thereby preventing a characteristics change of the TFT. Furthermore, the electrophoretic display according to the first embodiment of the present invention sequentially switches the data lines D1 to Dm, the common electrode 18, and the gate lines G1 to Gn to the high impedance state to cut off a current path within the display panel 14, thereby reducing power consumption. When voltages of the data lines D1 to Dm, the common electrode 18, and the gate lines G1 to Gn are simultaneously changed, the electrophoretic display according to the first embodiment of the present invention can prevent a reverse electromotive force. Herein, the counter electromotive force may be generated by a parasitic capacitance, etc.

Figure 8:
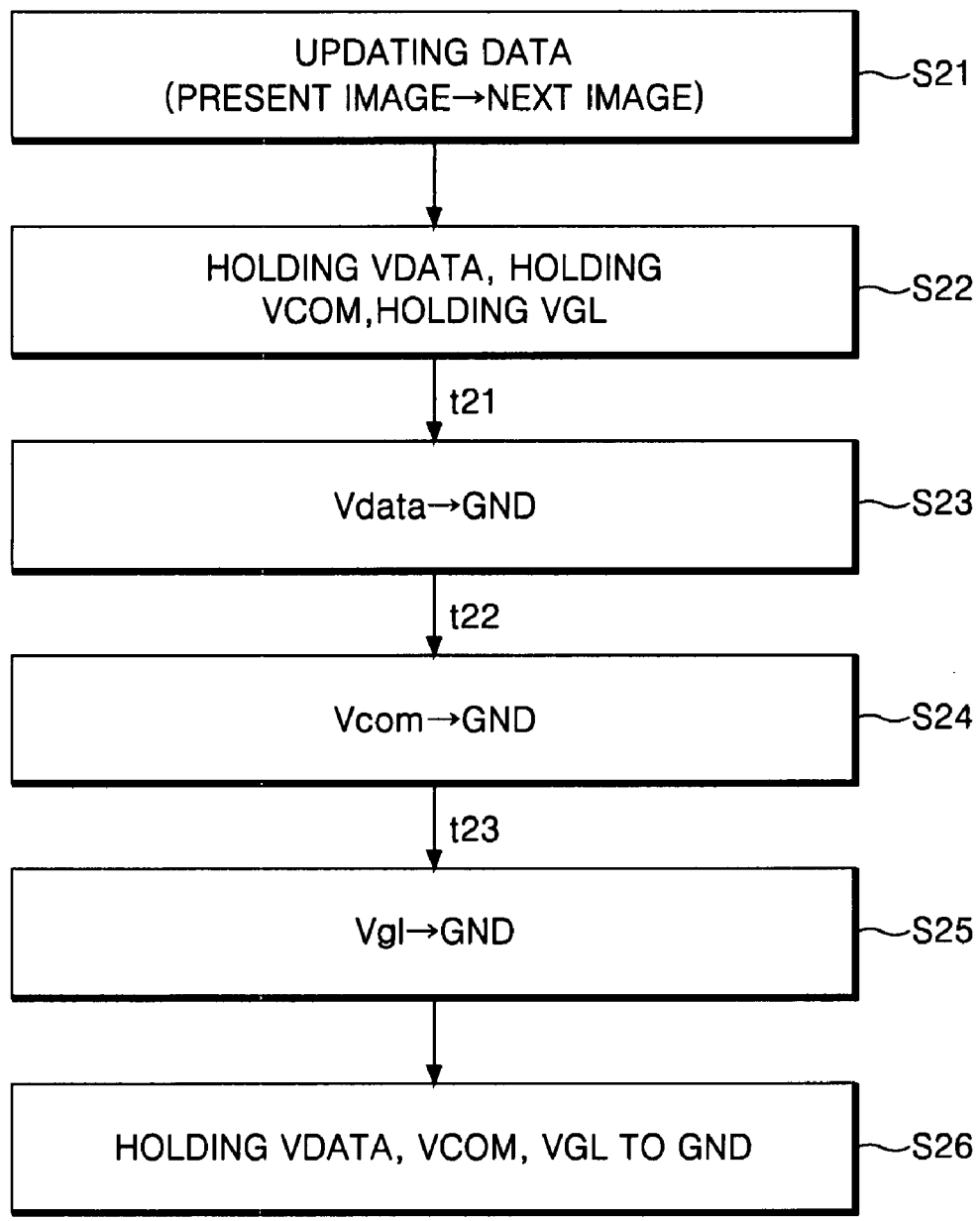
FIG. 8 shows a flow chart of an operation of an electrophoretic display device in a sleep-mode period according to a second embodiment of the present invention.
Figure 9:
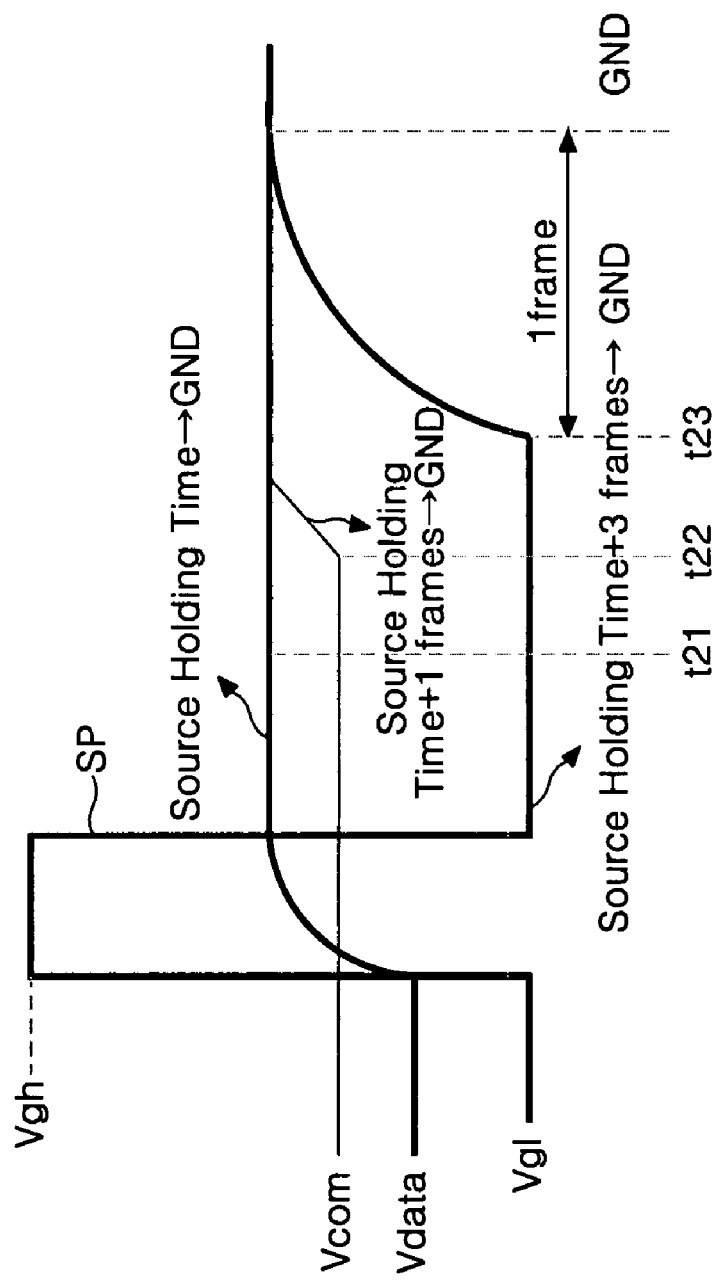
FIG. 9 shows a flow chart of a voltage waveform of an electrophoretic display device in the sleep-mode period according to the second embodiment of the present invention.

FIG. 8 shows a flow chart of an operation of an electrophoretic display device in a sleep-mode period according to a second embodiment of the present invention. FIG. 9 shows a flow chart of a voltage waveform of an electrophoretic display device in the sleep-mode period according to the second embodiment of the present invention. Referring to FIG. 8 and FIG. 9, the data driving circuit 12 maintains the data voltage Vdata substantially unchanged under the control of the timing controller 11 after updating the data. The gate driving circuit 13 lowers voltages of the gate lines G1 to Gn to the gate low voltage Vgl under the control of the timing controller 11 after updating the data. The DC to DC converter 15 maintains the common voltage Vcom after updating the data (S21 and S22).

Next, the data driving circuit 12 connects the output terminals which are connected to the data lines D1 to Dm, to a ground voltage source GND under the control of the timing controller 11 at a t21 point past the source holding time to supply the ground voltage GND, that is, 0V to the data lines D1 to Dm (S23).

The DC to DC converter 15 connects an output terminal to the ground voltage source GND under the control of the timing controller 11 at a t22 point about 1 to 2 frame periods past the source holding time to supply the ground voltage GND, that is, 0V to the common electrode 18 (S24). Herein, the output terminal is connected to the common electrode 18.

The gate driving circuit 13 connects the output terminals which are connected to the gate lines G1 to Gn, to the ground voltage source GND under the control of the timing controller 11 at a t23 point about 1 to 3 frame periods past the source holding time to supply the ground voltage GND, that is, 0V to the gate lines G1 to Gn (S25). Voltages of the gate lines G1 to Gn are boosted from the gate low voltage Vgl at the t23 point to reach at the ground voltage GND at a point about 1 frame period past the t23 point. A delayed time that voltages of the gate lines G1 to Gn are reached from the gate low voltage Vgl to the ground voltage GND, can be adjusted by a RC delay value of a RC delay circuit. Herein, the RC delay circuit is connected to the output terminal of the data driving circuit 13.

After voltages of the gate lines G1 to Gn reached the ground voltage GND, the data driving circuit 12 maintains voltages of the data lines D1 to Dm at the ground voltage GND, the DC to DC converter 15 maintains a voltage of the common electrode 18 at the ground voltage GND, and the gate driving circuit 13 maintains voltages of the gate lines G1 to Gn at the ground voltage GND.

The method of driving the electrophoretic display according to the second embodiment of the present invention converges voltages of the gate lines G1 to Gn to the ground voltage in the sleep-mode to reduce the gate bias stress of the TFTs, thereby preventing a characteristics change of the TFT. Furthermore, when voltages of the data lines D1 to Dm, the common electrode 18, and the gate lines G1 to Gn are simultaneously changed, the electrophoretic display according to the second embodiment of the present invention sequentially supplies the ground voltage GND to the data lines D1 to Dm, the common electrode 18, and the gate lines G1 to Gn to prevent a counter electromotive force. Herein, the counter electromotive force is generated by a parasitic capacitance, etc.

In a liquid crystal display device LCD, an organic light emitting diode OLED, and a plasma display panel PDP, since a display image disappears in a power reduction mode or the sleep-mode, the user does not contact with the display surface. On the other hand, the electrophoretic display can be applied to an E-book, for example. Since the electrophoretic display can remain in the same display state about 6 months after are going in the sleep-mode after updating the data, a body contact can frequently generate static electricity. Thus, the electrophoretic display is easily exposed to static electricity. The electrophoretic display according to the second embodiment of the present invention grounds the data lines D1 to Dm, the common electrode 17, and the gate lines G1 to Gn in the sleep-mode to effectively protect a cell array from a static electricity. Herein, the static electricity is easily generated in the sleep-mode. If an unnecessary static electricity is generated in the sleep-mode, the unnecessary static electricity is dispersed into the grounded data lines D1 to Dm, the grounded common electrode 18, and the grounded gate lines G1 to Gn to be rapidly discharged.

In the second embodiment of the present invention, the timing controller 11 does not control the data driving circuit 12 and the gate driving circuit 13, and controls the DC to DC converter 15 in the sleep-mode to sequentially adjust an output of the DC to DC converter 15 to the ground voltage GND in a gamma compensation voltage output terminal, a common voltage output terminal, and a gate low voltage output terminal of the DC to DC converter 15.

Figure 10:
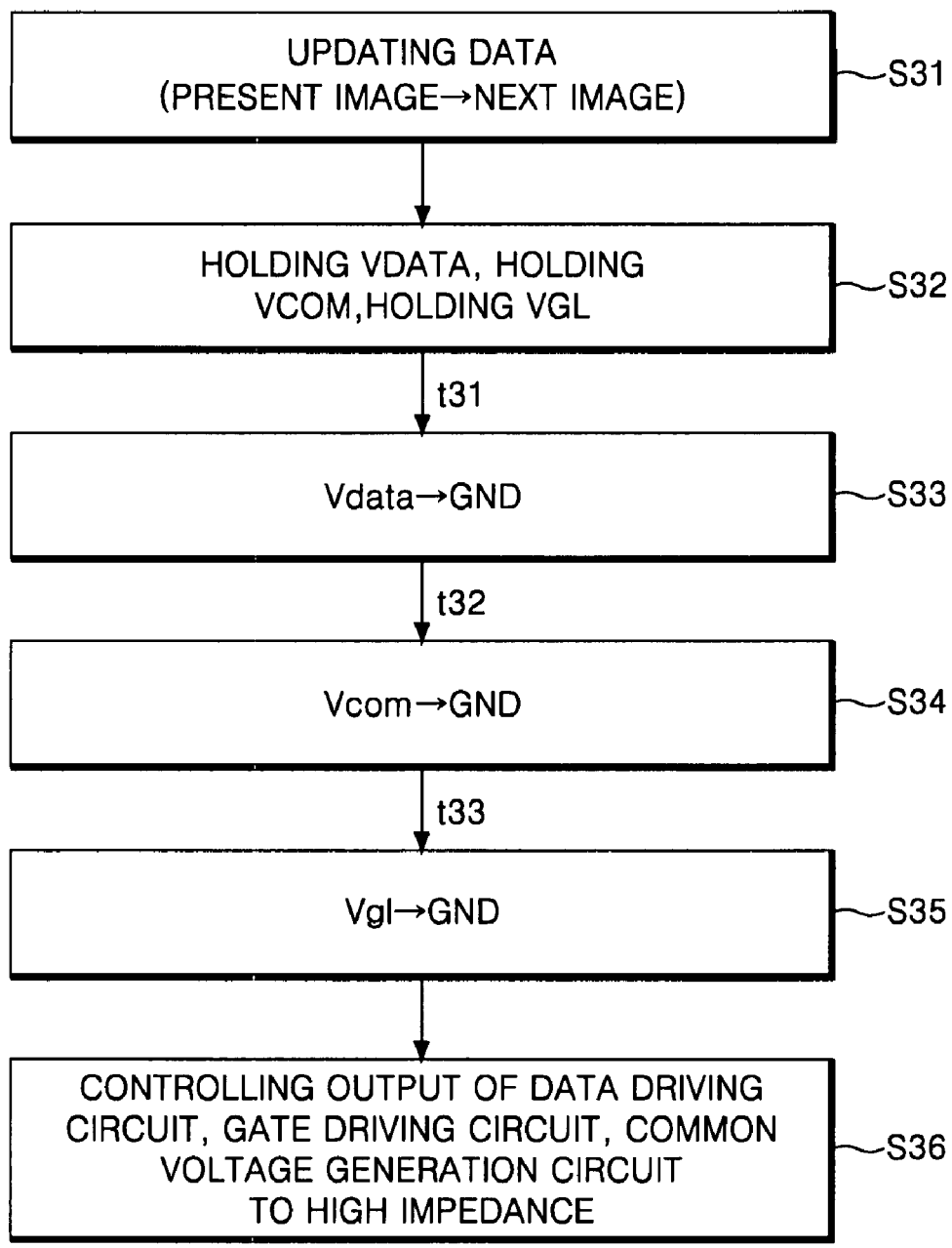
FIG. 10 shows a flow chart of an operation of an electrophoretic display device in a sleep-mode period according to a third embodiment of the present invention.
Figure 11:
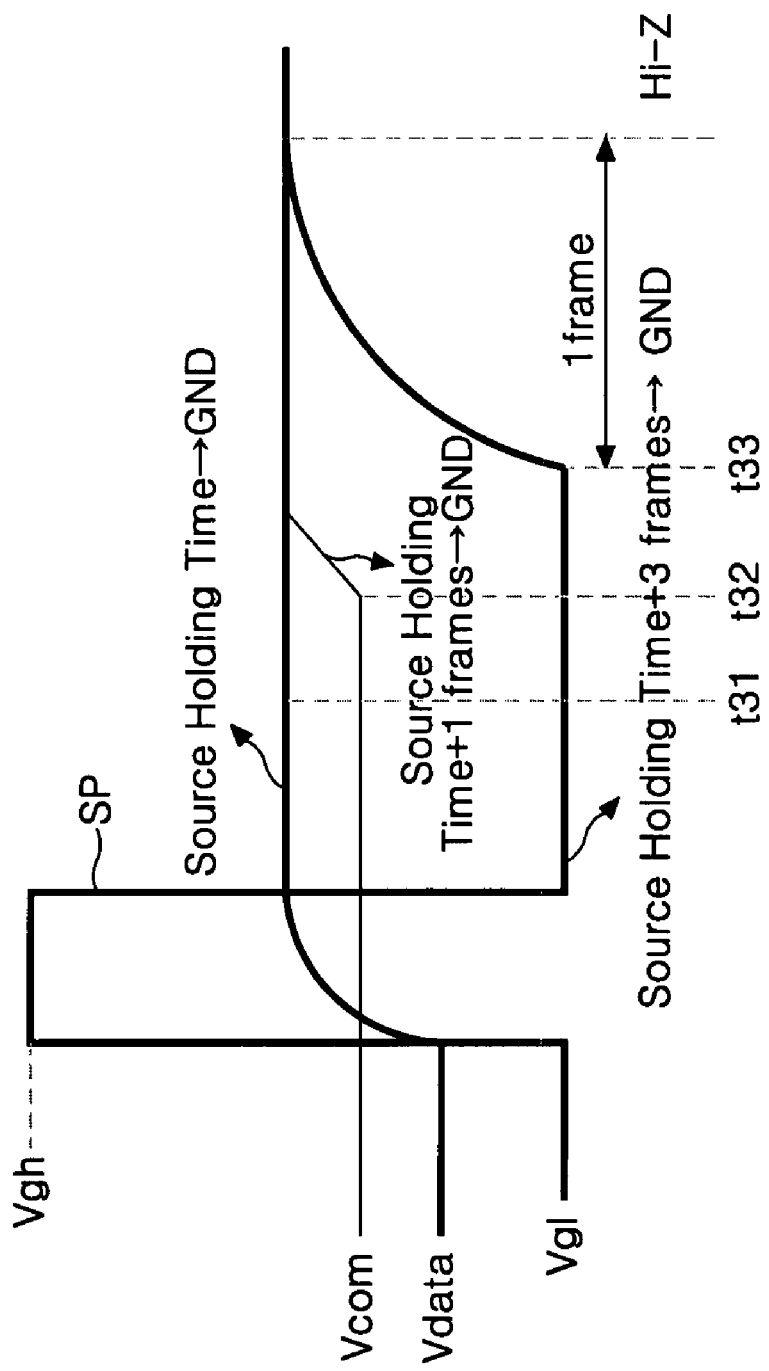
FIG. 11 shows a flow chart of a voltage waveform of an electrophoretic display device in the sleep-mode period according to the third embodiment of the present invention.

FIG. 10 shows a flow chart of an operation of an electrophoretic display device in a sleep-mode period according to a third embodiment of the present invention. FIG. 11 shows a flow chart of a voltage waveform of an electrophoretic display device in the sleep-mode period according to the third embodiment of the present invention. Referring to FIG. 10 and FIG. 11, the data driving circuit 12 maintains the data voltage Vdata substantially unchanged under the control of the timing controller 11 after updating the data. The gate driving circuit 13 lowers voltages of the gate lines G1 to Gn to the gate low voltage Vgl under the control of the timing controller 11 after updating the data. The DC to DC converter 15 maintains the common voltage Vcom after updating the data (S31 and S32).

Next, the data driving circuit 12 connects the output terminals which are connected to the data lines D1 to Dm to a ground voltage source GND under the control of the timing controller 11 at a t31 point past the source holding time to supply the ground voltage GND, that is, 0V to the data lines D1 to Dm (S33).

The DC to DC converter 15 connects an output terminal to the ground voltage source GND under the control of the timing controller 11 at a t32 point about 1 to 2 frame periods past the source holding time to supply the ground voltage GND, that is, 0V to the common electrode 18 (S34). Herein, the output terminal is connected to the common electrode 18.

The gate driving circuit 13 connects the output terminals which are connected to the gate lines G1 to Gn to the ground voltage source GND under the control of the timing controller 11 at a t33 point about 1 to 3 frame periods past the source holding time to supply the ground voltage GND, that is, 0V to the gate lines G1 to Gn (S35). Voltages of the gate lines G1 to Gn are boosted from the gate low voltage Vgl at the t33 point to reach at the ground voltage GND at a point about 1 frame period past the t33 point.

After voltages of the gate lines G1 to Gn are reached at the ground voltage GND, the data driving circuit 12 opens output terminals which are connected to the data lines D1 to Dm, and the DC to DC converter 15 opens output terminals which are connected to the common electrode 18 (S36). At the same time, the gate driving circuit 13 opens output terminals which are connected to the gate lines G1 to Gn. Accordingly, after voltages of the data lines D1 to Dm, a voltage of the common electrode 18, and voltages of the gate lines G1 to Gn are all converted into the ground voltage GND, the data lines D1 to Dm, the common electrode 18, and the gate lines G1 to Gn are changed into the high impedance state.

The method of driving the electrophoretic display according to the third embodiment of the present invention controls voltages of the gate lines G1 to Gn to the ground voltage in the sleep-mode to reduce the gate bias stress of the TFTs, thereby preventing a characteristics change of the TFT. Furthermore, when voltages of the data lines D1 to Dm, the common electrode 18, and the gate lines G1 to Gn are simultaneously changed, the electrophoretic display according to the third embodiment of the present invention sequentially supplies the ground voltage GND to the data lines D1 to Dm, the common electrode 18, and the gate lines G1 to Gn to prevent a counter electromotive force and to reduce a power consumption in the sleep-mode. Herein, the counter electromotive force is generated by a parasitic capacitance, etc.

Figure 12:
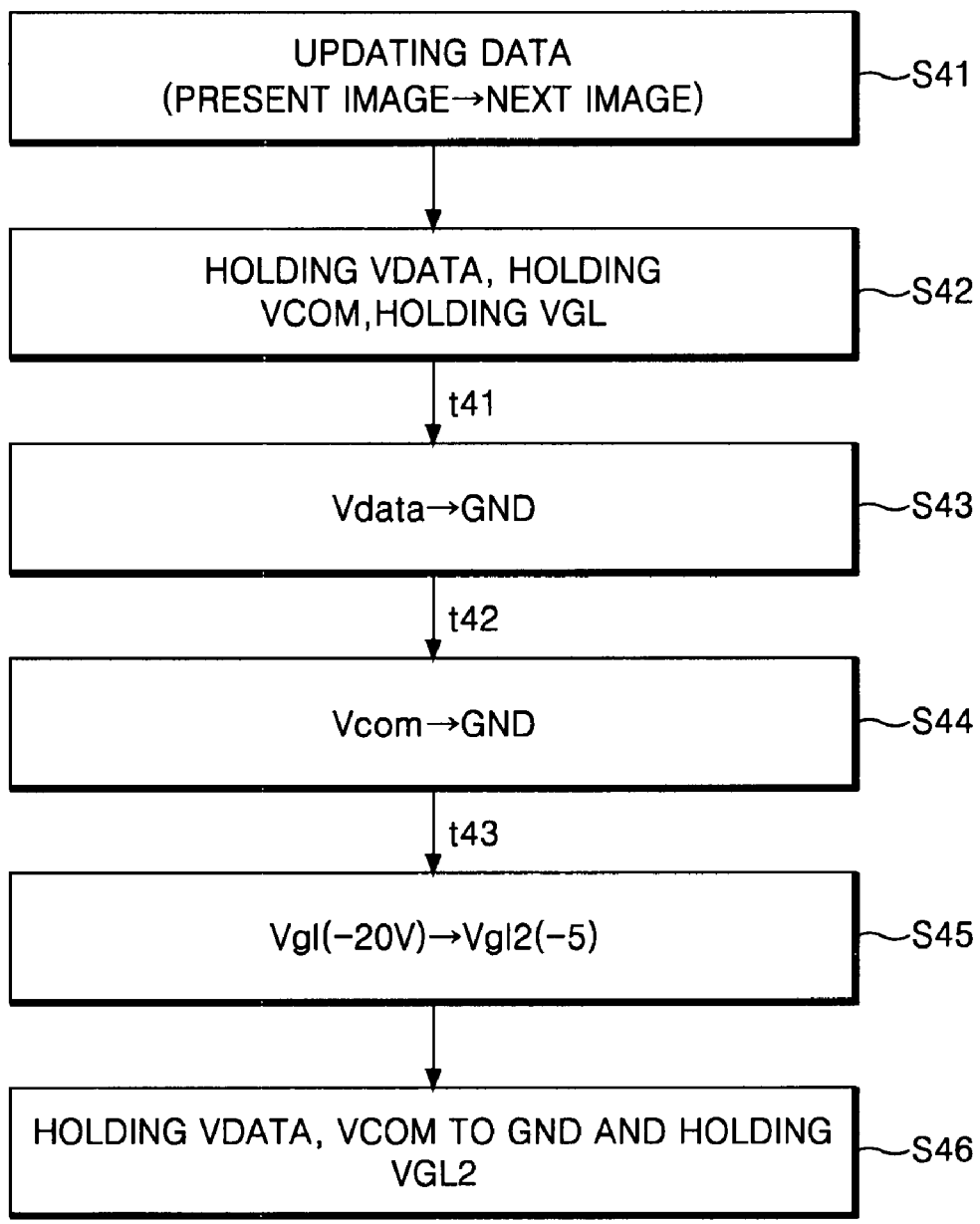
FIG. 12 shows a flow chart of an operation of an electrophoretic display device in a sleep-mode period according to a fourth embodiment of the present invention.
Figure 13:
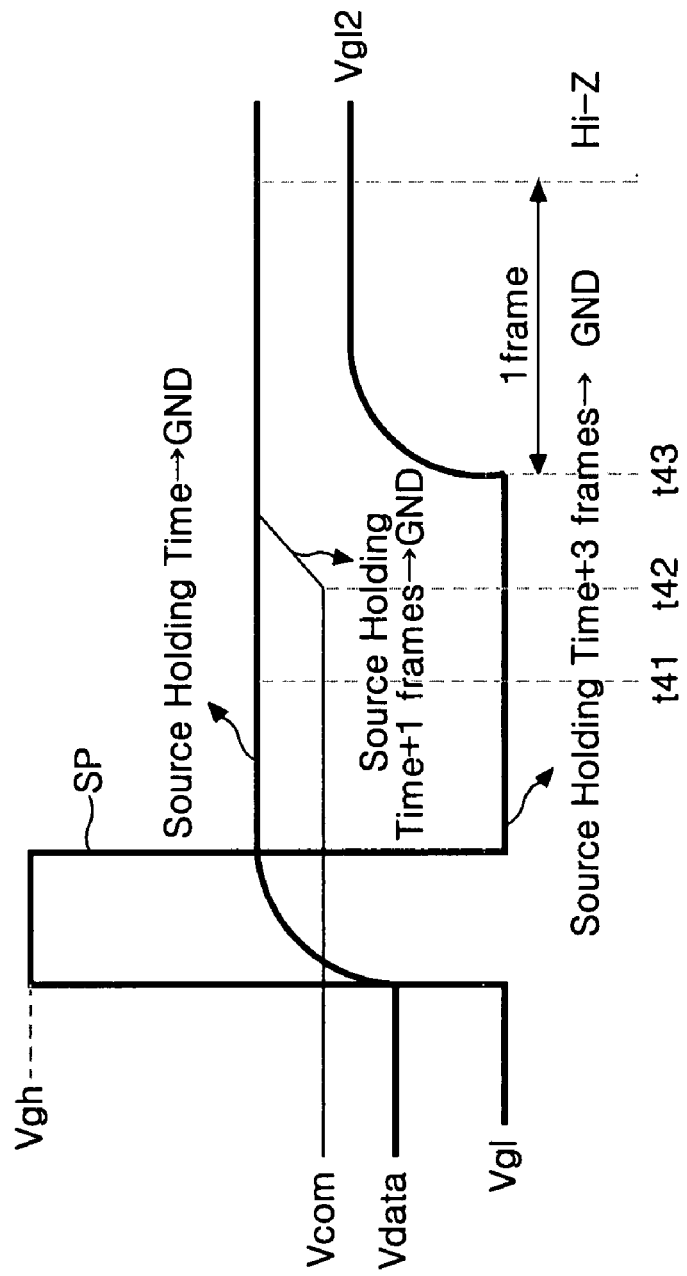
FIG. 13 shows a flow chart of a voltage waveform of an electrophoretic display device in the sleep-mode period according to the fourth embodiment of the present invention.

FIG. 12 shows a flow chart of an operation of an electrophoretic display device in a sleep-mode period according to a fourth embodiment of the present invention. FIG. 13 shows a flow chart of a voltage waveform of an electrophoretic display device in the sleep-mode period according to the fourth embodiment of the present invention. Referring to FIG. 12 and FIG. 13, the data driving circuit 12 maintains the data voltage Vdata substantially unchanged under the control of the timing controller 11 after updating the data. The gate driving circuit 13 lowers voltages of the gate lines G1 to Gn to the gate low voltage Vgl under the control of the timing controller 11 after updating the data. The DC to DC converter 15 maintains the common voltage Vcom after updating the data (S41 and S42).

Next, the data driving circuit 12 connects the output terminals connected to the data lines D1 to Dm to a ground voltage source GND under the control of the timing controller 11 at a t41 point past the source holding time to supply the ground voltage GND, that is, 0V to the data lines D1 to Dm (S43).

The DC to DC converter 15 connects an output terminal to the ground voltage source GND under the control of the timing controller 11 at a t42 point about 1 to 2 frame periods past the source holding time to supply the ground voltage GND, that is, 0V to the common electrode 18 (S44). Herein, the output terminal is connected to the common electrode 18.

The gate driving circuit 13 supplies a second gate low voltage Vgl2 between the gate low voltage Vgl and the ground voltage GND to the gate lines G1 to Gn under the control of the timing controller 11 at a t43 point about 1 to 3 frame periods past the source holding time (S45). Herein, the second gate low voltage Vgl2 is about −5V. Voltages of the gate lines G1 to Gn are boosted from the gate low voltage Vgl at the t43 point to reach at the second gate low voltage Vgl2 at a point about 1 frame period past the t43 point.

After voltages of the gate lines G1 to Gn reached the second gate low voltage Vgl2, the data driving circuit 12 maintains voltages of the data lines D1 to Dm at the ground voltage GND, the DC to DC converter 15 maintains a voltage of the common electrode 18 at the ground voltage GND, and the gate driving circuit 13 maintains voltages of the gate lines G1 to Gn at the second gate low voltage Vgl2.

In the fourth embodiment of the present invention, the timing controller 11 does not control the data driving circuit 12 and the gate driving circuit 13, and controls the DC to DC converter 15 in the sleep-mode. In this case, the DC to DC converter 15 sequentially connects the gamma compensation voltage output terminal and the common voltage output terminal to the ground voltage source, and then adjusts the gate low voltage Vgl to the second gate low voltage Vgl2 to output it via the gate low voltage output terminal.

The method of driving the electrophoretic display according to the fourth embodiment of the present invention converges voltages of the gate lines G1 to Gn to the ground voltage in the sleep-mode to reduce the gate bias stress of the TFTs, thereby preventing a characteristics change of the TFT. Furthermore, when voltages of the data lines D1 to Dm, the common electrode 18, and the gate lines G1 to Gn are simultaneously changed, the electrophoretic display according to the fourth embodiment of the present invention sequentially supplies the ground voltage GND to the data lines D1 to Dm and the common electrode 18, and then adjusts a voltage of the gate lines G1 to Gn to about −5V to prevent a counter electromotive force and to rapidly discharge an static electricity which can be generated in the sleep-mode. Herein, the counter electromotive force is generated by a parasitic capacitance, etc.

As described above, the electrophoretic display and the driving method according to an embodiment of the present invention control voltages of the gate lines to the high impedance state or change voltages of the gate line in the sleep-mode to the ground voltage to prevent a characteristics change of the semiconductor switching device, that is, the TFT or a generation of the off current. Furthermore, the electrophoretic display and the driving method according to an embodiment of the present invention sequentially adjust voltages of the data lines, a voltage of the common electrode, and voltages of the gate lines to the ground voltage in the sleep-mode to prevent a problem which is generated when voltages are simultaneously changed. Furthermore, the electrophoretic display and the driving method according to an embodiment of the present invention can reduce the power consumption, and can rapidly disperse and discharge the static electricity in the sleep-mode.

It will be apparent to those skilled in the art that various modifications and variations can be made in embodiments of the present invention. Thus, it is intended that embodiments of the present invention cover the modifications and variations of the embodiments described herein provided they come within the scope of the appended claims and their equivalents.

What is claimed is:

1. An electrophoretic display device sequentially driven during a data updating period when a data is updated and a sleep-mode period when a data is maintained, comprising:
an electrophoretic display panel including a plurality of data lines crossing a plurality of gate lines to form a plurality of cells, a plurality of pixel electrodes, a common electrode for driving each of the plurality of cells, and a TFT at a crossing of one of the data lines and one of the gate lines to supply a data voltage from the one of the data lines to a corresponding one of the pixel electrodes;
a data driving circuit supplying the data voltage to the data lines during the data updating period;
a gate driving circuit supplying a scanning pulse to the gate lines during the data updating period; and
a controller sequentially raising an impedance of each of the data lines, the common electrode, and the gate lines during the sleep-mode period,
wherein the data driving circuit maintains the data voltage unchanged under control of the controller for a source holding time of about 2 μs and opens an output terminal connected to the data lines under control of the controller in the sleep-mode immediately after the source holding time,
wherein the gate driving circuit lowers voltages of the gate lines to a gate low voltage of the scanning pulse under control of the controller after the data updating period and a common voltage supplied to the common electrode is maintained after the data updating period,
wherein the data updating period includes a reset period including a first interval to generate a data voltage of high potential voltage and a second interval to generate a data voltage of 0V, a first stabilization period, a second stabilization, and a data writing period,
wherein the data writing period includes a third interval to generate a data voltage of low potential voltage, and a fourth interval to generate a data voltage of 0V,
wherein a number of frames of the first interval is determined in accordance with the current data gray scale, and
wherein a number of frames of the third interval is determined in accordance with the next data gray scale.

2. The electrophoretic display device of claim 1, further comprising a power supply that opens an output terminal connected to the common electrode under the control of the controller in the sleep-mode one to two frame periods immediately after the source holding time.

3. The electrophoretic display device of claim 1, wherein the gate driving circuit opens an output terminal connected to the gate lines under the control of the controller in the sleep-mode one to three frame periods immediately after the source holding time.

4. An electrophoretic display device sequentially driven during a data updating period when a data is updated and a sleeping period when a data is maintained, comprising:
an electrophoretic display panel including a plurality of data lines crossing a plurality of gate lines to form a plurality of cells, a plurality of pixel electrodes, a common electrode for driving each of the plurality of cells, and a TFT at a crossing of one of the data lines and one of the gate lines to supply a data voltage from the one of the data lines to a corresponding one of the pixel electrodes;
a data driving circuit supplying a data voltage to the data lines during the data updating period;
a gate driving circuit supplying a scanning pulse swung between a gate high voltage and a gate low voltage to the gate lines during the data updating period; and
a controller sequentially converging voltages of the data lines and of the common electrode to a ground voltage during the sleeping period,
wherein the data driving circuit maintains the data voltage unchanged under control of the controller for a source holding time of about 2 μs and connects an output terminal at each of the data lines to a ground voltage source under control of the controller in the sleep-mode immediately after the source holding time,
wherein the gate driving circuit lowers voltages of the gate lines to a gate low voltage of the scanning pulse under control of the controller after the data updating period, and a common voltage supplied to the common electrode is maintained after the data updating period,
wherein the data updating period includes a reset period including a first interval to generate a data voltage of high potential voltage and a second interval to generate a data voltage of 0V, a first stabilization period, a second stabilization, and a data writing period,
wherein the data writing period includes a third interval to generate a data voltage of low potential voltage, and a fourth interval to generate a data voltage of 0V,
wherein a number of frames of the first interval is determined in accordance with the current data gray scale, and
wherein a number of frames of the third interval is determined in accordance with the next data gray scale.

5. The electrophoretic display device of claim 4, further comprising a power supply supplying a gamma compensation voltage to the data driving circuit, supplying the gate high voltage and the gate low voltage to the gate driving circuit, and supplying a common voltage to the common electrode during the data updating period.

6. The electrophoretic display device of claim 5, wherein the power supply connects an output terminal at the common electrode to the ground voltage source under the control of the controller in the sleep-mode one to two frame periods immediately after the source holding time.

7. The electrophoretic display device of claim 5, wherein the power supply responsive to the controller in the sleep-mode period connects an output terminal outputting the gamma compensation voltage to a ground voltage source, connects an output terminal outputting the common voltage to the ground voltage source, and then connects an output terminal outputting the gate low voltage to the ground voltage source.

8. The electrophoretic display device of claim 5, wherein the controller changes a voltage of the common electrode to the ground voltage and then changes voltages of the gate lines to a second gate low voltage between the ground voltage and the gate low voltage.

9. The electrophoretic display device of claim 8, wherein the data driving circuit connects an output terminal connected to the data lines to a ground voltage source under the control of the controller immediately following a source holding time.

10. The electrophoretic display device of claim 9, wherein the power supply connects an output terminal connected to the common electrode to the ground voltage source under the control of the controller after 1 to 2 frame periods following the source holding time.

11. The electrophoretic display device of claim 10, wherein the gate driving circuit supplies the second gate low voltage to the gate lines under the control of the controller after 1 to 3 frame periods following the source holding time.

12. The electrophoretic display device of claim 11, wherein after voltages of the gate lines are changed into the second gate low voltage, the data driving circuit maintains voltages of the data lines at the ground voltage, the power supply maintains a voltage of the common electrode at the ground voltage and the gate driving circuit maintains voltages of the gate lines at the second gate low voltage.

13. The electrophoretic display device of claim 11, wherein after voltages of the gate lines are changed into the second gate low voltage, the data driving circuit opens an output terminal connected to the data lines to convert the data lines into a high impedance state, the power supply opens an output terminal connected to the common electrode to convert the common electrode into the high impedance state, and the gate driving circuit opens an output terminal connected to the gate lines to convert the gate lines into the high impedance state.

14. The electrophoretic display device of claim 8, wherein the power supply responsive to the controller during the sleeping period connects an output terminal outputting the gamma compensation voltage to a ground voltage source, connects an output terminal outputting the common voltage to the ground voltage source, and then supplies the second gate low voltage to an output terminal outputting the gate low voltage.

15. The electrophoretic display device of claim 4, wherein the controller changes a voltage of the common electrode to the ground voltage and then changes voltages of the gate lines to the ground voltage.

16. The electrophoretic display device of claim 15, wherein the gate driving circuit connects an output terminal at the gate lines to the ground voltage source under the control of the controller in the sleep-mode one to three frame periods immediately after the source holding time.

17. The electrophoretic display device of claim 16, wherein after voltages of the gate lines are changed to the ground voltage, the data driving circuit maintains voltages of the data lines at the ground voltage, the power supply maintains a voltage of the common electrode at the ground voltage, and the gate driving circuit maintains voltages of the gate lines at the ground voltage.

18. The electrophoretic display device of claim 16, wherein after voltages of the gate lines are changed to the ground voltage, the data driving circuit opens an output terminal connected to the data lines to convert the data lines into a high impedance state, the power supply opens an output terminal connected to the common electrode to convert the common electrode into the high impedance state, and the gate driving circuit opens an output terminal connected to the gate lines to convert the gate lines into the high impedance state.

19. A method of driving an electrophoretic display device including an electrophoretic display panel including a plurality of data lines crossing a plurality of gate lines to form a plurality of cells, a plurality of pixel electrodes, a common electrode for driving each of the plurality of cells, and a TFT at a crossing of one of the data lines and one of the gate lines to supply a data voltage from the one of the data lines to a corresponding one of the pixel electrodes, the method comprising:

supplying a data voltage to the one of data lines during a data updating period;

supplying a scanning pulse to the one of the gate lines during the data updating period and sequentially raising the plurality of the data lines, the common electrode, and the plurality of the gate lines into a high impedance state in a sleeping period following the data updating period, wherein a voltage of the data lines maintains a level of the data voltage supplied to the data lines for a source holding time of about 2 µs, a gate low voltage supplied to the gate lines is lower after the data updating period and the common electrodes maintain the common voltage supplied to the common electrode after the data updating period, wherein the data updating period includes a reset period including a first interval to generate a data voltage of high potential voltage and a second interval to generate a data voltage of 0V, a first stabilization period, a second stabilization, and a data writing period, wherein the data writing period includes a third interval to generate a data voltage of low potential voltage, and a fourth interval to generate a data voltage of 0V, wherein a number of frames of the first interval is determined in accordance with the current data gray scale, and wherein a number of frames of the third interval is determined in accordance with the next data gray scale.

20. A method of driving an electrophoretic display device including an electrophoretic display panel including a plurality of data lines crossing a plurality of gate lines to form a plurality of cells, a plurality of pixel electrodes, a common electrode for driving each of the plurality of cells, and a TFT at a crossing of one of the data lines and one of the gate lines to supply a data voltage from the one of the data lines to a corresponding one of the pixel electrodes, the method comprising:

supplying a data voltage to one of the data lines during a data updating period;

supplying a scanning pulse swung between a gate high voltage and a gate low voltage to one of the gate lines during the data updating period; and sequentially converging voltages of the gate lines and of the common electrode into a ground voltage in a sleeping period following the data updating period, wherein a voltage of the data lines maintains a level of the data voltage supplied to the data lines for a source holding time of about 2 µs, a gate low voltage supplied to the gate lines is lower after the data updating period and the common electrodes maintain the common voltage supplied to the common electrode after the data updating period, wherein the data updating period includes a reset period including a first interval to generate a data voltage of high potential voltage and a second interval to generate a data voltage of 0V, a first stabilization period, a second stabilization, and a data writing period, wherein the data writing period includes a third interval to generate a data voltage of low potential voltage, and a fourth interval to generate a data voltage of 0V, wherein a number of frames of the first interval is determined in accordance with the current data gray scale, and wherein a number of frames of the third interval is determined in accordance with the next data gray scale.

21. The method of claim 20, further comprising changing a voltage of the common electrode into the ground voltage, and then changing voltages of the gate lines into the ground voltage.

22. The method of claim 20, further comprising changing a voltage of the common electrode into the ground voltage, and then changing voltages of the gate lines into a second gate low voltage between the ground voltage and the gate low voltage.

* * * * *